(12) United States Patent
Choi et al.

(10) Patent No.: US 7,862,786 B2
(45) Date of Patent: Jan. 4, 2011

(54) SELECTIVE PRECIPITATION OF METAL SULFIDES

(75) Inventors: Yeonuk Choi, Oakville (CA); Peter Kondos, Toronto (CA); Jacques McMullen, Oakville (CA)

(73) Assignee: Barrick Gold Corporation, Toronto Ontario (CA)

( * ) Notice: Subject to any disclaimer, the term of this patent is extended or adjusted under 35 U.S.C. 154(b) by 7 days.

(21) Appl. No.: 11/928,229

(22) Filed: Oct. 30, 2007

(65) Prior Publication Data

US 2008/0274026 A1    Nov. 6, 2008

Related U.S. Application Data

(60) Provisional application No. 60/863,512, filed on Oct. 30, 2006.

(51) Int. Cl.
    *C01G 9/00* (2006.01)
(52) U.S. Cl. .................. 423/106; 423/43; 423/146; 210/601
(58) Field of Classification Search .................. None
    See application file for complete search history.

(56) References Cited

U.S. PATENT DOCUMENTS

| | | | |
|---|---|---|---|
| 3,421,850 A | | 1/1969 | Peterson et al. |
| 3,964,901 A | | 6/1976 | Swinkels et al. |
| 4,024,218 A | | 5/1977 | McKay et al. |
| 4,049,770 A | | 9/1977 | Swinkels et al. |
| 4,073,860 A | | 2/1978 | Huggins et al. |
| 4,405,570 A | | 9/1983 | Van der Meulen et al. |
| 4,572,822 A | | 2/1986 | Abe et al. |
| 5,587,079 A | * | 12/1996 | Rowley et al. .............. 210/603 |
| 5,762,807 A | | 6/1998 | Straten |
| 6,103,204 A | | 8/2000 | Lizama et al. |
| 6,153,108 A | | 11/2000 | Klock et al. |
| 6,395,242 B1 | | 5/2002 | Allen et al. |
| 6,843,976 B2 | | 1/2005 | Allen et al. |
| 6,991,593 B2 | | 1/2006 | Price et al. |
| 7,018,605 B2 | | 3/2006 | Kobayashi et al. |
| 2002/0094564 A1 | * | 7/2002 | Banfield et al. .............. 435/262 |

FOREIGN PATENT DOCUMENTS

| | | |
|---|---|---|
| CA | 2147554 A1 | 10/1996 |
| EP | 0262964 A2 | 6/1988 |
| JP | 63045130 | 2/1988 |
| JP | 2002121624 | 4/2002 |

OTHER PUBLICATIONS

Pugsley, Removal of Heavy Metals from Mine Drainage in Colorado by Precipitation, Chemical Engineering Progress Symposium Series (1971), vol. 67, No. 107, pp. 75-89.*

(Continued)

*Primary Examiner*—Melvin C Mayes
*Assistant Examiner*—Melissa Stalder
(74) *Attorney, Agent, or Firm*—Senniger Powers LLP

(57) ABSTRACT

A method for recovering zinc ions by selective zinc sulfide precipitation from an aqueous solution comprising zinc ions and metal ions of a metal that precipitates as a metal sulfide at a pH lower than a pH at which zinc ions precipitate as a zinc sulfide.

29 Claims, 1 Drawing Sheet

OTHER PUBLICATIONS

Fathi Habashi, Hydrolytic and Ionic Precipitation, A Textbook of Hydrometallurgy, Metallurgie Extractive Quebec (1999), p. 624-625.*

Abstract of JP63045130; Feb. 26, 1988.

Abstract of JP2002121624; Apr. 26, 2002.

Ayres, D. et al., "Removing Heavy Metals from Wastewater", Engineering Research Center Report, University of Maryland, pp. 1-21, Aug. 1994.

"Precipitation—General Discussion and Theory", Engineering Manual, pp. 1-7, vol. EM 1110-1-4012, Nov. 15, 2001.

Amer, S., "Treating Metal Finishing Wastewater", Aquachem Inc., pp. 1-7, Mar./Apr. 1998.

"Hydroxide Precipitation", Hoffland Environmental Inc., Internet, Nov. 21, 2007, 3 pages, <http://www.hoffland.net/src/tks/3.xml>.

"In-Situ Remediation of Heavy Metals" FAST-TEK, Internet, Nov. 21, 2007, 2 pages, <http://www.fast-tek.com/TM107.pdf>.

Habashi, F., A Textbook of Hydrometallurgy, "Chapter 24: Hydrolytic and Ionic Precipitation", 1999, pp. 623-625, Metallurgie Extractive Quebec, Sainte-Foy, Quebec.

Pugsley et al., "Removal of Heavy Metals from Mine Drainage in Colorado by Precipitation", Chemical Engineering Progress Symposium Series, 1971, vol. 67, No. 107, pp. 75-89.

Tabak et al., "Advances in biotreatment of acid mine drainage and biorecovery of metals: 1. Metal precipitation for recovery and recycle", Biodegradation, 2003, vol. 14, pp. 423-436.

International Search Report, PCT/CA2007/001930, dated Feb. 13, 2008, 5 pages.

Written Opinion of the International Searching Authority, PCT/CA2007/001930, dated Feb. 13, 2008, 7 pages.

* cited by examiner

SELECTIVE PRECIPITATION OF METAL SULFIDES

FIELD OF THE INVENTION

This invention generally relates to metal recovery, and more specifically to a process for precipitating high purity zinc sulfide from an aqueous solution such as process wash solutions, mine effluents, acid mine drainage, autoclave discharge solutions, leached solution, or similar solutions.

BACKGROUND OF THE INVENTION

The adjustment and maintenance of solution pH with alkali as required for selective sulfide precipitation of zinc at a pH of 4.1 is known to improve both the hydrogen sulfide uptake in solution and the associated precipitation kinetics. The adjustment of pH also results in the co-precipitation of gypsum and other metals such as aluminum as aluminum hydroxide and reduces the purity and value of the recovered zinc sulfide product.

The precipitation of heavy metals as metallic sulfides from aqueous solutions is a common and long practiced method of solution purification and metal recovery. It is known that these precipitation reactions occur at a pH that is characteristic to the sulfide formed. The order in which the heavy metal sulfides precipitate with increasing pH is: $As_2S_5$, HgS, CuS, $Sb_2S_3$, $Bi_2S_3$, $SnS_2$, CdS, PbS, SnS, ZnS, CoS, NiS, FeS, and MnS. See U.S. Pat. No. 4,278,539.

Hydrogen sulfide, ammonium sulfide, sodium sulfide, and sodium hydrosulfide (NaSH) are the most common precipitating agents. Typically, hydrogen sulfide gas is employed to react with the solubilized metal salts (usually sulfates and/or chlorides). The usual practice is to mix the metal containing feed solution with hydrogen sulfide in an amount in excess to that required to precipitate the metal sulfide of interest. Because pH is viewed as a crucial control step the pH of the aqueous feed liquid must be below that at which precipitation can be initiated. In the case of those metal sulfides, e.g., $SnS_2$ and CdS, which form under slightly acidic conditions, it may be necessary to lower the pH, by adding an appropriate amount of an acid, to ensure that precipitation of non target elements is not initiated.

To recover metal sulfides such as $As_2S_5$, HgS, and CuS, which form even under very acidic conditions, a soluble salt of a metal (such as iron or manganese) the sulfide of which is soluble within the pH range of the feed liquid can be added to the solution. When hydrogen sulfide is introduced it reacts preferentially with the added metal ions to form soluble sulfides rather than with the metal ion or ions to be removed. When pH of the solution is increased, the sulfide ions are controllably precipitated as insoluble sulfides and isolated from the soluble sulfides. See U.S. Pat. No. 4,278,539.

Metals such as copper, nickel, cobalt, and zinc can be precipitated from process solutions as sulfides when their concentrations in solution are relatively low. This process is used as a solution purification or effluent treatment as well as for metal recovery. It has been reported that metal values at much higher concentrations can be isolated in this manner. For example, Outokumpu purifies a solution containing 20 g/L cobalt, 6-8 g/L nickel, 7-8 g/L copper, and 10-12 g/L zinc by selectively removing copper, zinc, nickel, and cobalt, in that order. See Textbook of Hydrometallurgy $2^{nd}$ edition, Fathi Habashi.

Precipitation of the metal sulfide occurs by the following reaction:

$$MSO_4 + H_2S => MS + H_2SO_4 \qquad (1)$$

Acid is generated during the sulfide precipitation, and continuous addition of alkali to control the pH within the optimal range is normally practiced. Lime neutralization of this acid results in the contamination of the zinc product by gypsum, according to the following reaction:

$$H_2SO_4 + Ca(OH)_2 => 3CaSO_4.2H_2O \qquad (1)$$

At the pH required for zinc precipitation by sulfide, the following reactions may also occur upon adjustment, if aluminum is present in solution:

$$Al_2(SO_4)_3 + 6NaOH => 2Al(OH)_3 + 3Na_2SO_4 \qquad (1)$$

$$Al_2(SO_4)_3 + 3Ca(OH)_2 + 6H_2O => 2Al(OH)_3 + 3CaSO_4.2H_2O \qquad (2)$$

Use of lime results in gypsum and aluminum hydroxide formation. Employing sodium hydroxide produces soluble sodium sulfate, which reduces the contamination of the zinc product recovered to some degree.

SUMMARY OF THE INVENTION

Among the various objects of the invention are selective precipitation of zinc sulfide and improvement of hydrogen sulfide gas efficiency during the selective precipitation of metal sulfides.

Briefly, the invention is directed to a method for recovering copper ions and zinc ions from an aqueous solution comprising iron ions, copper ions, and zinc ions by selective precipitation. The method comprises the steps of (a) adjusting the pH of the aqueous solution to a pH sufficient to precipitate the iron ions as an iron oxy-hydroxide compound while avoiding the precipitation of compounds of copper and zinc thereby yielding an iron oxy-hydroxide precipitate and a solution comprising copper ions and zinc ions; (b) contacting the aqueous solution with a source of sulfide ion to precipitate the copper ions as a copper sulfide salt while avoiding the precipitation of the sulfide of zinc thereby yielding copper sulfide precipitate and a solution comprising zinc ions; and (c) contacting the aqueous solution with a source of sulfide ion in a concentration sufficient to precipitate the zinc ions as a zinc sulfide.

The invention is yet further directed to a method for recovering zinc ions from an aqueous solution comprising zinc ions and metal ions of a metal that precipitates as a metal sulfide at a pH lower than a pH at which zinc ions precipitate as a zinc sulfide. The method comprises the following steps in order: (a) contacting the aqueous solution with a source of sulfide to precipitate the metal ions as the metal sulfide while avoiding the precipitation of the zinc sulfide; and (b) contacting the aqueous solution with a source of sulfide to add sulfide ion in a concentration sufficient to precipitate the zinc ions as the zinc sulfide; wherein the aqueous solution is contacted with a source of sulfide in step (b) without any pH adjustment after step (a).

Other objects and aspects of the invention will be, in part, pointed out and, in part, apparent hereinafter.

DETAILED DESCRIPTION OF THE PREFERRED EMBODIMENT(S)

Figure 1:
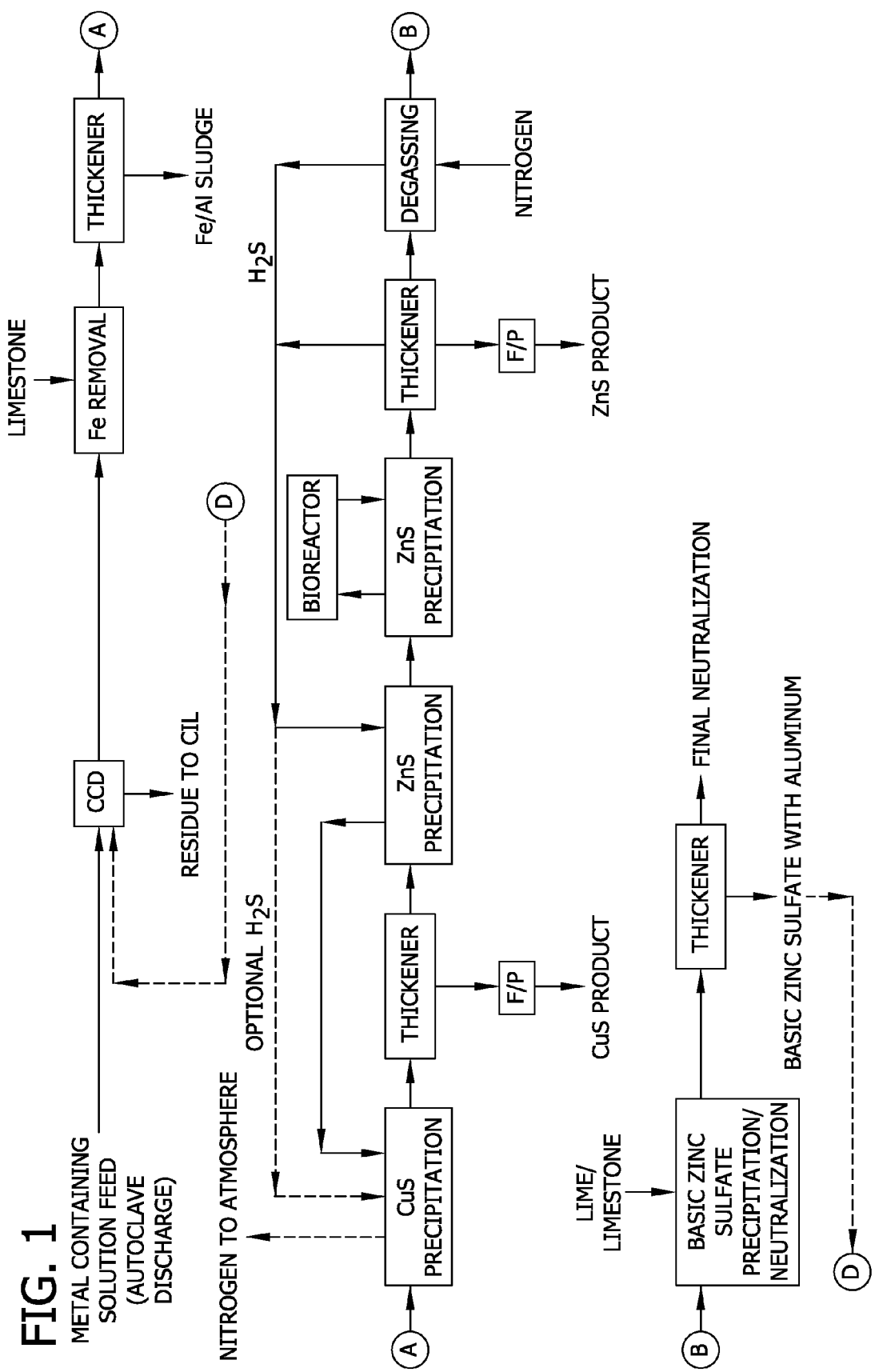
FIG. 1 is a flow chart depicting an embodiment of the process of the present invention.

According to one embodiment of the present invention, zinc sulfide from an aqueous solution is precipitated without pH adjustment, yielding a higher purity product. Precipitation is performed using an amount of hydrogen sulfide gas at or near the saturation point at a pH between about 1.0 and about 2.5. Hydrogen sulfide collected from off gas streams and stripped from the hydrogen sulfide saturated solution in the zinc precipitation step is employed for the precipitation of other base metals, such as copper.

According to one embodiment of the present invention, the hydrogen sulfide recovered from the initial zinc precipitation stage as well as off gases collected during zinc sulfide thickening and the degassing of zinc barren solutions, is diverted to the first contactor of zinc precipitation and to the copper precipitation step, where the hydrogen sulfide is removed from the nitrogen carrier gas.

According to one embodiment of the present invention, an excess amount of hydrogen sulfide is used to precipitate a base metal from solution, without the adjustment of pH. In this process, to recover a pure product, metals capable of removal at the pH attained during excess sulfide addition process are preferably not present in solution. For example, to recover zinc, metals that form sulfides at a pH below that of zinc, such as copper, are removed from the solution prior to zinc precipitation. A number of techniques can be employed to accomplish this such as pH controlled sulfide precipitation, or other solution purification techniques, such as alkali precipitation, cementation, or similar metal specific processes. By eliminating the pH adjustment step, the co-precipitation of aluminum hydroxide and gypsum with the zinc product is avoided.

In addition, the relatively high concentration of hydrogen sulfide employed to shift the reaction equilibrium and favor the precipitation of zinc sulfide at low pH will result in $H_2S$ rich off gases and solutions with unreacted hydrogen sulfide. Therefore, excess $H_2S$ may be recovered and recycled for use in precipitation of another metal. For example, in one embodiment, hydrogen sulfide recovered from the initial zinc precipitation stage as well as off gases collected during zinc sulfide thickening and the degassing of zinc barren solutions is diverted to the copper precipitation step, where the hydrogen sulfide content of the nitrogen carrier gas is consumed during copper sulfide precipitation.

Since the solubility of hydrogen sulfide in solution increases with increasing acidity, therefore the efficiency of hydrogen sulfide gas addition will decrease when the pH drops from 3.5 to 1.0. Therefore to maximize hydrogen sulfide utilization, hydrogen sulfide rich off-gas from the second stage of zinc precipitation is recycled back to the bio-reactor. In the bio-reactor the concentration of hydrogen gas is increased prior to re-introduction to the second stage zinc precipitation.

Referring now to FIG. 1, the feed solution contains dissolved base metals such as copper, zinc, aluminum, and iron. The feed solution is shown here as autoclave discharge, but can also be, for example, a dilute leach solution, acid mine drainage, wash solution, or other process solutions containing heavy metals and dilute acid.

In the case where the feed is composed primarily of autoclave discharge, there is an optional hot curing process (not shown) which can be performed in which basic iron sulfates formed during the pressure oxidation or leaching step react with free acid contained in the autoclave liquor to form dissolved iron sulphate. In addition basic zinc sulfates formed during the basic zinc sulfate precipitation neutralization process can be directed to the hot curing operation where they will also react with acid in the autoclave liquor by this reaction:

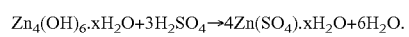

$$Zn_4(OH)_6.xH_2O+3H_2SO_4 \rightarrow 4Zn(SO_4).xH_2O+6H_2O.$$

This optional hot curing process has a residence time between about 1 and about 24 hours and a preferred temperature range between about 85° C. and about 95° C.

The solids fraction of the feed material is separated from the solution fraction by counter current decantation (CCD) as shown in FIG. 1. The dashed line from D into the CCD represents an optional operation where all or a portion of basic zinc sulfate from a final precipitation operation at the end of the overall process is recycled to the beginning of the process and added to leach solution or CCD overflow, where it is dissolved by the residual acid contained in the solution portion. The solids fraction residue from the CCD operation goes to a carbon-in-leach (CIL) or other treatment operation. The solution fraction is directed to an iron removal operation.

Iron removal is performed in a series of stirred reaction vessels with the addition of lime, limestone, or other suitable alkali to achieve a terminal pH sufficient to precipitate iron oxy-hydroxide. The terminal pH may be between about 2.5 and about 3.5. Iron precipitates predominantly as $Fe(OH)_3$. At a pH within this range, approximately 0.5 g/L iron ions remain in solution by maintaining the pH within this range, and the loss of copper and zinc ions from the solution phase is minimized. In addition, between 50% and 90% of aluminum ions are also precipitated as $Al(OH)_3$.

The iron oxy-hydroxide precipitate is removed from the solution by liquid/solid separation techniques such as a conventional thickener as indicated in FIG. 1, which yields an Fe/Al sludge separated from an iron-depleted solution, which is directed to a copper sulfide precipitation.

Copper sulfide precipitation is performed in a series of contactors. Copper sulfide precipitation may be performed at the terminal pH of the iron precipitation step, which may be between about 2.5 and about 3.5. So no pH adjustment is performed to precipitate copper sulfide. In this contacting operation, the solution containing zinc ions and copper ions is contacted with a sulfide source to precipitate copper ions as copper sulfide. This reaction yields sulfuric acid and lowers the pH of the aqueous solution to between about 1.0 and about 2.5, more typically between about 1.5 and about 2.5. The source of sulfide for precipitation of copper in this operation may be an external source of $H_2S$ gas or recycled $H_2S$ gas which remains in the carrier stream of nitrogen after the first zinc precipitation contactor. The level of sulfide in this reaction step may be supplemented by sodium hydrosulfide (NaSH), sodium sulfide, ammonium sulfide or hydrogen sulfide which is either purchased or generated by a bio-reaction process such as those described in U.S. Pat. No. 6,852,305 (Buisman et al.) or Canadian Pat. No. 2,147,554 (Rowley et al.), the entire disclosures of which are incorporated by reference, or by the catalytic reduction of elemental sulfur at elevated pressure and temperature. $H_2S$ depleted carrier gas (e.g., nitrogen) is released to atmosphere as shown or recycled in process.

After the copper sulfide precipitation operation, solid/liquid separation of copper sulfide precipitate is performed by conventional methods, such as by a thickener as shown in FIG. 1. The copper sulfide is dewatered by conventional techniques such as centrifugation, pressure filtration, or vacuum filtration to produce a wet copper concentrate cake cupper sulfide product.

The copper depleted solution, having a pH between about 1.0 and about 2.5, more typically between about 1.5 and about 2.5, is advanced to zinc sulfide precipitation. Preferably, the zinc sulfide precipitation occurs without pH adjustment. Zinc sulfide precipitation is performed in a series of contactors. In the first contactor, hydrogen sulfide from the subsequent zinc thickener and solution degassing steps is the source of sulfide for zinc precipitation.

The solution containing a partially precipitated zinc component is then exposed to hydrogen sulfide generated by an alternative source, for example, a bioreactor process such as described above. Application of excess sulfide, up to solution saturation levels, is applied in a second contactor. Zinc sulfide is formed as a precipitate. The precipitate is at least about 90% zinc sulfide, preferably at least about 95% zinc sulfide. The excess $H_2S$ from the second ZnS precipitation operation as shown in FIG. 1 is directed back to the bioreactor and the level is increased.

Separation of zinc sulfide from zinc depleted solution using a conventional thickener or other suitable conventional solid liquid separation technique. Volatile hydrogen sulfide is collected during this operation and sent, as represented by the arrow leaving upwardly from the thickener, to the preliminary zinc sulfide precipitation stages as described previously.

After thickening and liquid/solid separation, hydrogen sulfide degassing of the zinc depleted solution is performed with nitrogen. The contained hydrogen sulfide is sent to the preliminary zinc precipitation steps as described previously and shown by the arrow in FIG. 1.

Any zinc remaining in solution after sulfide precipitation is precipitated as basic zinc sulfate upon the addition of limestone and lime in a subsequent operation as shown at the bottom of FIG. 1. Aluminum may co-precipitate with the basic zinc sulfate. This basic zinc sulfate precipitate with aluminum is separated from the solution by a conventional thickener or other suitable conventional liquid/solid separation techniques.

Then, the final zinc depleted solution is neutralized, while the zinc sulfate is transferred (path D) secondary basic zinc sulfide dissolution steps as shown in FIG. 1, optionally preceded by the hot curing discussed above.

Off gases are collected from the first zinc contactor, from the degassing, from the zinc sulfide precipitation, and from the zinc sulfide solid/liquid separation steps and this gas stream is employed in the copper sulfide precipitation operation. In particular, they are contacted with the copper rich solution in the copper sulfide precipitation circuit to effect the precipitation of copper and to remove hydrogen sulfide from the carrier gas.

In an alternative embodiment, the supply of $H_2S$ for copper sulfide precipitation circuit is supplemented with gas collected from the first zinc contactor degassing, zinc sulfide precipitation, and zinc sulfide solid/liquid separation steps.

If a bioreactor system is employed, all or a portion of the hydrogen sulfide off gas may be diverted to the bioreactor in order to increase the hydrogen sulfide concentration, prior to contact with the zinc solution in the secondary zinc sulfide precipitation contactors, or the copper depleted solution in the zinc precipitation contactor. If a bioreactor is not employed, the hydrogen sulfide concentration in the carrier gas is increased to between 8% and 12% v/v by the addition of sulfide reagents.

The dilution/carrier/and stripping gas is nitrogen or air. The dilution/carrier gas is nitrogen in the zinc sulfide contactor when a bioreactor is used to generate the hydrogen sulfide gas.

In view of the above, it will be seen that the several objects of the invention are achieved and other advantageous results attained.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A method for recovering copper ions and zinc ions from an aqueous solution comprising iron ions, copper ions, and zinc ions by selective precipitation, the method comprising:
   (a) adjusting the pH of the aqueous solution to a pH sufficient to precipitate the iron ions as an iron oxy-hydroxide compound while avoiding the precipitation of compounds of copper and zinc thereby yielding an iron oxy-hydroxide precipitate and an iron-depleted aqueous solution comprising copper ions and zinc ions;
   (b) contacting the iron-depleted aqueous solution with a source of sulfide ion comprising hydrogen sulfide to precipitate the copper ions as a copper sulfide while avoiding the precipitation of the sulfide of zinc thereby yielding copper sulfide precipitate and a copper-depleted aqueous solution comprising zinc ions; and
   (c) contacting the copper-depleted aqueous solution with a source of sulfide ion comprising hydrogen sulfide in a concentration sufficient to precipitate the zinc ions as a zinc sulfide wherein co-precipitation of aluminum hydroxide and gypsum therewith is avoided;
   wherein the pH of the copper-depleted solution produced in (b) is lower than the pH of the iron-depleted solution produced in (a); and
   wherein the steps (a), (b), and (c) are carried out in that order.

2. The method of claim 1 wherein the adjusting the pH involves adjusting the pH to between about 2.5 and about 3.5 to precipitate the iron ions as iron oxy-hydroxide.

3. The method of claim 1 wherein said iron-depleted aqueous solution comprising copper ions and zinc ions has a pH between about 2.5 and about 3.5 and wherein said contacting step (b) is performed at an initial pH between about 2.5 and about 3.5.

4. The method of claim 1 further comprising the step of separating the precipitated iron oxy-hydroxide from the iron-depleted aqueous solution using a solid-liquid separation technique.

5. The method of claim 1 wherein the source of sulfide is generated by a bio-reaction process.

6. The method of claim 1 further comprising the step of separating the precipitated copper sulfide from the copper-depleted aqueous solution using a solid-liquid separation technique.

7. The method of claim 1 wherein the pH of the aqueous solution after step (b) is between about 1.0 and about 2.5.

8. The method of claim 1 wherein said solution depleted of copper ions has a pH between about 1.0 and about 2.5 and wherein said contacting step (c) is performed at said pH between about 1.0 and about 2.5.

9. The method of claim 1 further comprising the step of separating the precipitated zinc sulfide from the aqueous solution using a solid-liquid separation technique.

10. The method of claim 9 further comprising the step of removing hydrogen sulfide from the aqueous solution after separating the precipitated zinc sulfide from the aqueous solution.

11. The method of claim 10 wherein the hydrogen sulfide is removed from the aqueous solution by degassing with nitrogen gas or air.

12. The method of claim 10 wherein the source of sulfide in step (c) is the hydrogen sulfide removed from the aqueous solution.

13. The method of claim 12 wherein the source of sulfide in step (c) additionally comprises sulfide obtained from a bio-reaction process.

14. The method of claim 9 further comprising the step of removing hydrogen sulfide from the aqueous solution before separating the precipitated zinc sulfide from the aqueous solution.

15. The method of claim 14 wherein the source of sulfide in step (b) is the hydrogen sulfide removed from the aqueous solution in the operation of claim 14.

16. The method of claim 1 wherein the aqueous solution further comprises aluminum ions.

17. A method for recovering zinc ions from an aqueous solution comprising zinc ions and metal ions of a metal that precipitates as a metal sulfide at a pH lower than a pH at which zinc ions precipitate as a zinc sulfide, the method comprising, in order:
   (a) contacting the aqueous solution with a source of sulfide to precipitate the metal ions as the metal sulfide while avoiding the precipitation of the zinc sulfide thereby yielding the metal sulfide precipitate and a solution comprising zinc ions wherein the contacting with the source of sulfide ions to precipitate the metal sulfide is performed at an initial pH between about 2.5 and about 3.5 and wherein said contacting with the source of sulfide ions to precipitate the metal sulfide yields sulfuric acid, which lowers the pH of the aqueous solution to between about 1.0 and about 2.5; and
   (b) contacting the aqueous solution at said pH between about 1.0 and about 2.5 with a source of sulfide ion in a concentration sufficient to precipitate the zinc ions as the zinc sulfide.

18. The method of claim 17 wherein the metal that precipitates as the metal sulfide at a pH lower than a pH at which zinc ions precipitate as a zinc sulfide is copper.

19. The method of claim 1 wherein the source of hydrogen sulfide in step (b) is a bioreactor separate from the process stream.

20. The method of claim 1 wherein the source of hydrogen sulfide in step (c) is a bioreactor separate from the process stream.

21. The method of claim 1 wherein a bioreactor is used to generate the hydrogen sulfide of steps (b) and/or (c).

22. The method of claim 1 wherein a bioreactor is used to generate the hydrogen sulfide of steps (b) and/or (c) and nitrogen is used as a dilution/carrier gas to transport the hydrogen sulfide.

23. The method of claim 1 wherein the zinc sulfide produced in step (c) is produced in a zinc sulfide precipitate comprising at least about 90% zinc sulfide.

24. The method of claim 1 wherein the zinc sulfide produced in step (c) is produced in a zinc sulfide precipitate comprising at least about 95% zinc sulfide.

25. The method of claim 1 further comprising a solid/liquid separation after step (c) to separate the zinc sulfide precipitate from zinc-depleted solution, and directing hydrogen sulfide collected during the solid/liquid separation to step (c) for zinc precipitation.

26. The method of claim 1 further comprising a solid/liquid separation after step (c) to separate the zinc sulfide precipitate from zinc-depleted solution, and directing hydrogen sulfide collected during the solid/liquid separation to step (b) for copper precipitation.

27. The method of claim 21 further comprising degassing with nitrogen to recover hydrogen sulfide from the zinc-depleted solution and directing said recovered hydrogen sulfide to the bioreactor.

28. The method of claim 1 further comprising degassing with nitrogen to recover hydrogen sulfide from the zinc-depleted solution and directing said recovered hydrogen sulfide to step (c) for zinc precipitation.

29. The method of claim 1 further comprising degassing with nitrogen to recover hydrogen sulfide from the zinc-depleted solution and directing said recovered hydrogen sulfide to step (b) for copper precipitation.

* * * * *